United States Patent [19]

Heitmann et al.

[11] Patent Number: 5,237,461
[45] Date of Patent: Aug. 17, 1993

[54] METHOD AND APPARATUS FOR REPRODUCING VIDEO DATA STORED ON A MAGNETIC TAPE IN A MANNER FACILITATING SEARCH AND SLOW-MOTION OPERATION

[75] Inventors: Jürgen Heitmann, Alsbach-Hähnlein; Rolf Loos, Eppertshausen; Roland Mester, Darmstadt, all of Fed. Rep. of Germany

[73] Assignee: Robert Bosch GmbH, Stuttgart, Fed. Rep. of Germany

[21] Appl. No.: 935,480

[22] Filed: Aug. 25, 1992

Related U.S. Application Data

[63] Continuation of Ser. No. 07/545,752, Jun. 28, 1990, abandoned, which is a continuation of Ser. No. 07/193,903, May 13, 1988, abandoned.

[30] Foreign Application Priority Data

Jun. 3, 1987 [DE] Fed. Rep. of Germany ....... 3718567

[51] Int. Cl.$^5$ ............................ G11B 5/02; H04N 5/78
[52] U.S. Cl. ................................... 360/19.1; 360/33.1; 360/61; 358/343
[58] Field of Search ................ 360/10.3, 19.1, 22, 360/23, 48, 64, 32, 33.1; 358/343, 335

[56] References Cited

U.S. PATENT DOCUMENTS

| | | | |
|---|---|---|---|
| 4,139,867 | 2/1979 | Foerster . | |
| 4,210,938 | 7/1980 | Heitmann et al. . | |
| 4,293,879 | 10/1981 | Heitmann et al. . | |
| 4,597,020 | 6/1986 | Wilkinson | 360/10.3 |
| 4,685,004 | 8/1987 | Takahashi et al. | 360/48 X |
| 4,698,698 | 10/1987 | Collins | 360/10.3 X |
| 4,706,137 | 11/1987 | Tanaka | 360/64 |
| 4,788,604 | 11/1988 | Takeuchi | 360/10.3 |
| 4,827,359 | 5/1989 | Ookawa et al. | 360/10.3 |
| 4,835,627 | 5/1989 | Endo et al. | 360/48 X |
| 4,835,628 | 5/1989 | Hinz et al. | 360/48 |

FOREIGN PATENT DOCUMENTS

| | | | |
|---|---|---|---|
| 3044623 | 7/1982 | Fed. Rep. of Germany | 360/10.3 |
| 0231876 | 1/1986 | Fed. Rep. of Germany | 360/48 |
| 58-188314 | 11/1983 | Japan | 360/10.3 |

OTHER PUBLICATIONS

"Experimental PCM-VTR"; Yokoyama et al: NHK Lab. Notes Ser. No. 236, Apr. 1979, pp. 1-7.
English Translation of JP 58-188314.
Tech. 3252-E "Standard for recording digital television signals on magnetic tape in cassettes" European Broadcasting Union—Sep. 1986, Chapters 3-5.
Tech 3252—EBU—Digital Television Recording. Chapter 6—Making-up and insertion of synchronization signals—pp. 76-82.
Fernseh- Und Kino-Technik Jan. 1987, Heft ½ pp. 15-22.
"Standard for recording digital television signals on magnetic tape in cassettes"; EBU; First Edition, Sep. 1986.

*Primary Examiner*—Andrew L. Sniezek
*Attorney, Agent, or Firm*—Frishauf, Holtz, Goodman & Woodward

[57] ABSTRACT

As many as three of the four heads spaced at 90° intervals around the periphery of a head wheel may be in contact with the magnetic tape of a video recorder and reproducer at the same time. Oblique tracks are recorded on the tape record video date in blocks corresponding to sectors, each composed of the same number of lines, each track beginning with a video sector and ending with another video sector with small audio blocks inbetween. Four different sector designations succeed each other in turn. The video data of each block is preceded by an identification signal of which the two most significant bits designate the sector. The sector designations are separated from the outputs of each of the magnetic heads and control a PROM, the output of which controls a crosspoint switch to direct data blocks in accordance with the sector identification to four memories and the audio blocks to an audio memory. When reproduction is performed at a speed faster or slower than the recording speed, the control data for the switch normally still has enough redundancy for correct switching but when the control data becomes inconsistent with the track pattern, an error is detected and the previous setting of the switch is preserved. Errors can be reduced by taking into account head wheel pulses on the tape or data from a longitudinal track on the tape.

22 Claims, 9 Drawing Sheets

| Control Signals | | | Data from Mag-head | | | |
|---|---|---|---|---|---|---|
| S58 | S59 | S60 | H0 | H1 | H2 | H3 |
| | | | \multicolumn{4}{c}{to Sector} | | | |
| 0 | 0 | 0 | S0 | S3 | S2 | S1 |
| 0 | 0 | 1 | S0 | S1 | S2 | S3 |
| 0 | 1 | 1 | S2 | S1 | S0 | S3 |
| 0 | 1 | 0 | S2 | S3 | S0 | S1 |
| 1 | 0 | 0 | S1 | S2 | S3 | S0 |
| 1 | 0 | 1 | S1 | S0 | S3 | S2 |
| 1 | 1 | 1 | S3 | S0 | S1 | S2 |
| 1 | 1 | 0 | S3 | S2 | S1 | S0 |

Fig. 4

| | IH3 | IH2 | IH1 | IH0 | S58 | S59 | S60 | F | H3 | H2 | H1 | H0 |
|---|---|---|---|---|---|---|---|---|---|---|---|---|
| | | | | | | | | | \multicolumn{4}{c}{to Sector S...} | | | | |
| | — | — | — | — | — | — | — | — | — | — | — | — |
| | — | — | — | — | — | — | — | — | — | — | — | — |
| a) | 0 | 1 | 2 | 2 | 1 | 1 | 0 | 0 | 0 | 1 | 2 | (3) |
| b) | 0 | 1 | 2 | 3 | 1 | 1 | 0 | 0 | 0 | 1 | 2 | 3 |
| c) | 0 | 1 | 3 | 0 | 0 | 0 | 0 | 0 | (1) | (2) | 3 | 0 |
| d) | 0 | 1 | 3 | 1 | | | | 1 | | | | |
| | — | — | — | — | — | — | — | — | — | — | — | — |
| | — | — | — | — | — | — | — | — | — | — | — | — |

Fig. 5

METHOD AND APPARATUS FOR REPRODUCING VIDEO DATA STORED ON A MAGNETIC TAPE IN A MANNER FACILITATING SEARCH AND SLOW-MOTION OPERATION

This application is a continuation of application Ser. No. 07/545,752, filed Jun. 28, 1990, which was a continuation of application Ser. No. 07/193,903, filed May 13, 1988 both now abandoned.

The invention concerns reproduction of video signals recorded on magnetic tape and tracks which are at an oblique angle to the lengthwise dimension of the tape. More particularly, it relates to such video data reproduction in which every track comprises several sectors of the picture and several tracks are read out simultaneously by magnetic heads disposed around the circumference of a head wheel for scanning the tape obliquely.

BACKGROUND AND PRIOR ART

In German Patent 26 42 019 corresponding to U.S. Pat. No. 4,139,867 a method of reproducing video signals from a tape in individual tracks is described which permits slow-motion and rapid-scanning reproduction in which the tracks running obliquely to the length direction of the tape are crossed during reproduction by the magnetic heads. To put together a complete television picture only those time sections of the reproduced signals are used which are sufficient to satisfy prescribed requirements. These selected sections are written into an intermediate memory and they are read out in a manner conforming to the appropriate television standard. The recognition of time sections of a quality worth storing is done by recognition of the signal content or by evaluation of the envelope curve of the carrier frequency recorded signals. In this system the individual lines of the television picture can at the tone of recording be provided already with addresses for purposes of storing in the intermediate memory.

Another method of reproducing video signals stored on a magnetic tape at a reproduction speed different from the recording speed is known from German Patent 27 25 365 corresponding to U.S. Pat No. 4,210,938 in which the line addresses for the intermediate storing are first provisionally established in reproduction by evaluation of the instantaneous position of the head wheel and of the tape, in each case relative to a reference position. The method assumes that the magnetization regions for each line of the television picture is always recorded in exactly the same position relative to its surrounding on the magnetic tape and also is picked up by the head wheel Finally, a system is known from German Patent 28 41 728 corresponding to U.S. Pat. No. 4,293,879 in which the line addresses are to be derived exclusively from the reproduced video signal. For that purpose the horizontal and vertical frequency synchronizing pulses are separated from the composition video signal obtained from the tape and also the pulse modulation arising from the passage of the magnetic head from one track to the neighboring track. These are used after appropriate pulse shaping for establishing the line addresses by counting.

In a known method of magnetic storing of digitally coded television signals the data are transmitted serially by blocks after scanning of the analog values, quantization and coding with addition of identification and check values. Because of the large transmission capability necessary, in the known magnetic tape equipment for recording and/or reproducing of digitally coded television signals, recording is provided in four parallel channels with correspondingly narrower transmission bandwidths. For recording and reproduction four magnetic heads are disposed around the circumference of a head wheel at equal spacings. The envelopment angle of the tape around the head wheel is 258°. The four magnetic heads contact one after the other with the magnetic tape and write on the magnetic tape in respective tracks running obliquely to the length direction of the tape. These track contain in each case two track segments, each belonging to different "sectors" of video data. These two segments are separated from each other in the region of the longitudinal axis bisecting the tape by a number of short track sections that contain different sound information. Each sector track segment contains video data differing from that of the other sectors.

Precautions are necessary in reproduction to ensure that each of the four magnetic heads read the date which were recorded by it or by an identical magnetic head of another apparatus constituted according to the same design. The particular arrangement of the track sections with video data on the magnetic tape makes necessary the switching over of the magnetic heads before and after the sectors provided for the video data from one video data channel to another of a particular video data channel. This takes place in recording in accordance with a predetermined pattern which repeats itself after each revolution of the head wheel. Further details of that system and method are to be found in the publication "Standard for Recording Digital Television Signals on Magnetic Tape in Cassettes" of the European Broadcasting Union, Tech 5252-E and also in the periodical "Fernseh- und Kinotechnik" 1987, Heft (Issue) 1/2, pages 15 to 22.

In reproduction measures must be carries out to assure that the video data subdivided over four channels are correctly put back together. For that purpose it is necessary to recognize which magnetic head reads data for which channel and from which sector. Very many and various switching schemes arise, however, when the reproduction of the recorded data is not done, as above assumed, at the same speed as recording, but at a speed different from the recording speed, for slow-motion examination of the picture or to speed up the picture or to carry out a search with visible pictures. In such a case, each magnetic head crosses the tape at an angle to the tracks and passes along two or more tracks in each scan in a manner dependent upon the tape transport speed, with an effect that is the same both in slow motion and in speeded up motion of the picture. Each magnetic head can accordingly read every track section with video data, but the video data read out by the rest of the magnetic heads are not independent from those of the first-mentioned head, but rather fixedly intercoupled therewith.

In known systems, each recorded block with digitally coded video data is preceded by an identification signal. Although by the identification signals it is possible to correlate simply, the allocation of the information read out to the sectors and thereby to the corresponding processing channels, there nevertheless are problems if an identification signal is misread and the subdivision of the data is spoiled by the misdirected switching. There is then no more storage space in the intermediate store for the correctly allocated data, for example under the preceding address. Besides, there is the risk of "bus collisions", against which therefore special precautions must be taken. In general, therefore, there is no possibility of checking the correctness of the switched paths for data paths which are automatically switched on the basis of identification signals.

SUMMARY OF THE INVENTION

It is an object of the invention to provide a method and apparatus for reproduction of video data recorded on a magnetic tape of the general kind above discussed, in which the above-mentioned disadvantages are avoided.

Briefly, the video data read out by the magnetic heads are passed through a crosspoint switch or a crosspoint switching system and are written into several different sector oriented memories. In other words, they are sorted out into sector oriented sequences by means of a permutative switching system in which the signals from any of the magnetic heads can be switched to any of the sector oriented memories from which the data can be put together normally in serial form regardless of the playback speed.

A still more reliable implementation of the invention is is one, in which the identification signals of the video data of all magnetic heads are separated, and then are evaluated taking account of the position of the individual data blocks on the magnetic tape. Then control signals are obtained by selecting out those identification signals whose values accord with those values which are based upon the position of the data blocks on a tape, while disregarding the rest.

Further elaborations and refinements of the invention are possible, for example by the use of error recognition circuits, which will be more readily understood in connection with a detailed description further below.

The invention in its broadest range of application has the advantage that the subdivision of the data is to a considerable extent independent of errors in the information read from the magnetic tape. There is the further advantage that the method of the invention can be carried out with relatively simple apparatus.

BRIEF DESCRIPTION OF THE DRAWINGS

The invention is further described by way of illustrative example with reference to the annexed drawings, in which:

FIG. 4 is a table showing eight control signals necessary for setting up the possible combinations of connections between four magnetic heads and four sectors of the cross point switching system;

FIG. 5 is a table for deriving the control signals from the identification signals;

The same components are shown in the various figures of the drawings with the same reference numerals.

DESCRIPTION OF THE ILLUSTRATED EMBODIMENTS

Figure 1:
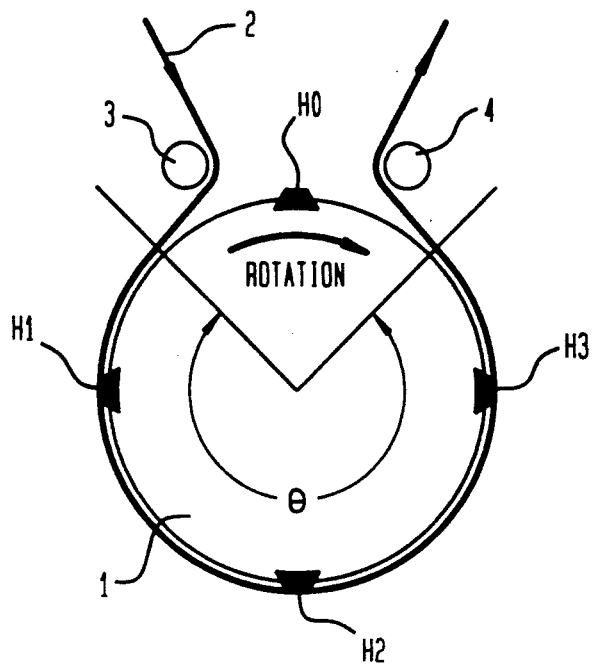
FIG. 1 is a schematic representation of a tape scanning device having four magnetic heads arranged on a head wheel.

FIG. 1 schematically shows a head wheel 1, on the rim of which four magnetic heads H0, H1, H2 and H3 are disposed, each spaced by an angular spacing of 90° from the next. The head wheel 1 turns in the direction of the arrow shown on the drawing and has a magnetic tape 2 would around it being led to the head wheel by a first guide roller 3 and then lead away from the head wheel over a second guide roller 4. The envelopment angle theta ($\theta$) is 258°, so that at least two of the magnetic heads, and most of the time even three of them, are in contact with the tape.

In practice, the head wheel turns on a vertical axis between drum surfaces, in a well known manner, and the guide rollers 3 and 4 are at different heights, so that the tape has a helical course about the head wheel axis and the heads H0 to H3 inscribe or scan approximately at an angle with the direction of tape advance. In practical embodiments of apparatus for digital recording of video signals, further additional heads are provided on the head wheel, the illustration and explanation of which is not necessary, however, in connection with the present invention, as will be understood by those familiar with digital recording and reproduction tape apparatus.

On account of the high bit rate, 227 Mbit/s, the flow of data is distributed among four channels, but in this case, however, there are no fixed connections between the magnetic heads H0 to H3 and the channel to which their instantaneous contributions to the data flow are connected. The information regarding this relation of channels to magnetic heads is to be found in the publication Tech 3252-E "Standard for Recording Digital Television Signals on Magnetic Tape in Cassettes" of the European Broadcasting Union (EBU), first edition, September 1986.

Figure 2:
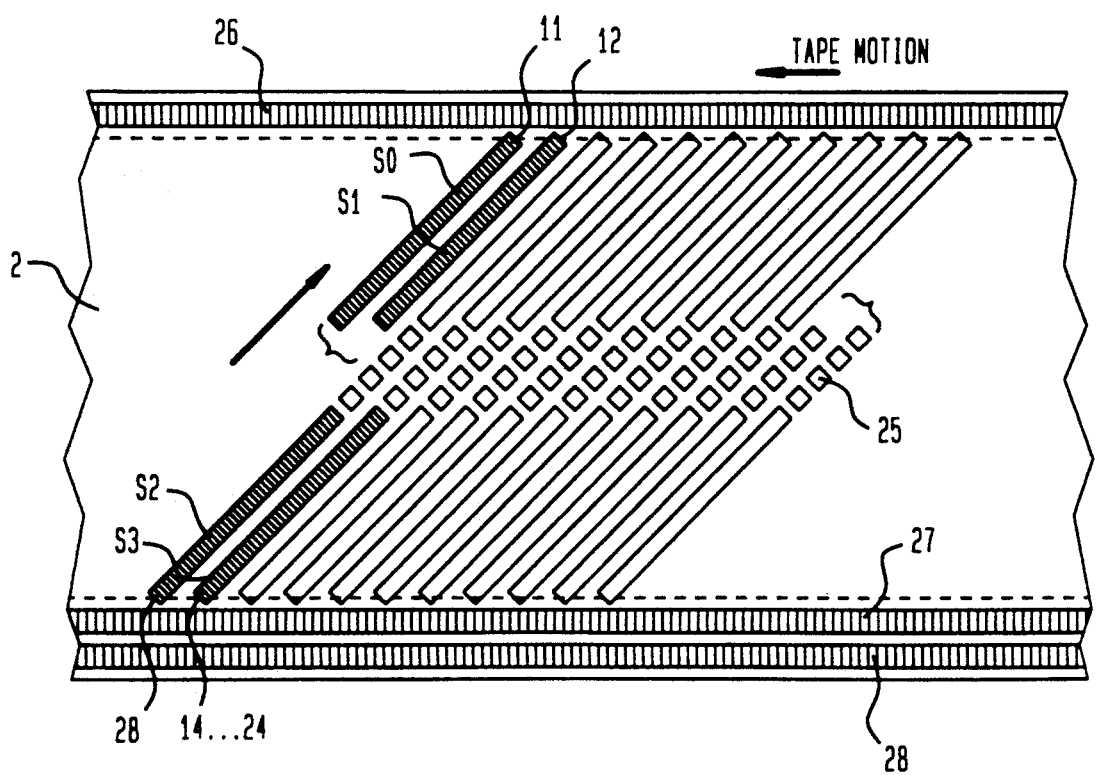
FIG. 2 is a diagram section of the magnetic tape showing the track pattern recording by magnetic heads.

The publication just mentioned, furthermore, defines a track pattern which will now be explained by reference to FIG. 2. For reasons of providing a readily understood illustration, the width of the tracks, and the angle between the tracks and the length dimension of the tape, are substantially exaggerated in FIG. 2.

With every quarter revolution of the head wheel during and a longitudinal movement of the tape 2 the track is either recorded or scanned. In recording, a magnetic head writes a track with a quarter revolution of the head wheel which includes, between two video sectors, some short track sections 25 for audio data.

Twelve tracks are necessary for recording a picture field (half frame). Four sectors S0 to S3 belong to every single segment of a picture field. The first segment of the picture field is therefore recorded in sectors S0, S1, S2 and S3 in the illustration given in FIG. 2. Each picture segment consists, as shown in FIG. 2, of two tracks.

In accordance with the European television 625-line standard, the following values result: In twelve tracks are the data of 300 lines of a picture field (the vertical blanking interval is not recorded), in each case four sectors—for example the sectors S0, S1, S2, S3—contain the information of 50 lines. In the recording of video signals according to the 525-line standard, only 250 lines are recorded for each field, requiring ten tracks in that case instead of 12.

In addition to the oblique tracks, three longitudinal tracks are provided on the tape. One of them, a so-called cue-audio-track 26, provides supplementary sound information of the recording. A control track 27 serves for regulation of tape transport and a time code track 28 serves for recording and reproducing a time code.

Figure 3:
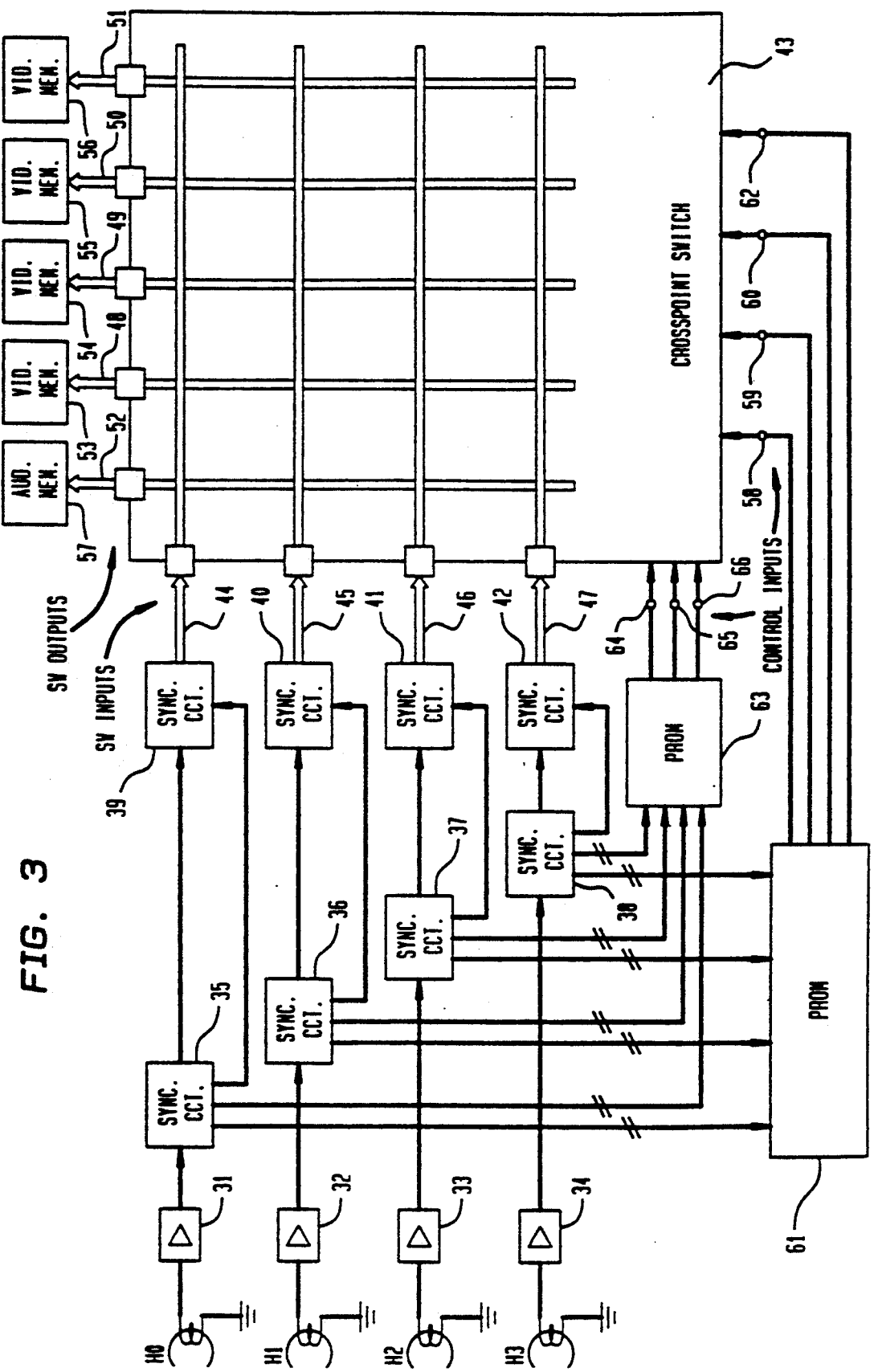
FIG. 3 is a block circuit diagram of a first embodiment of apparatus in accordance with the invention for carrying out the method of the invention.

The block circuit diagram of FIG. 3 shows that the signals produced by the magnetic heads H0 to H3 are first prepared for further processing in signal preparation circuits 31 to 34 respectively. These provide output amplification for compensation for distortion dependent upon frequency and also provide quantization with respect to both amplitude and frequency range, so that there are provided at the outputs of the respective circuits 31 to 34 digital signals ready for further processing.

The synchronizing signals and identification signals preceding each data block are separated in the circuits 35 to 38 which respectively follow the circuits 31 to 34. The synchronizing signals are needed in the circuits 35 to 38 and 39 to 42 as well as for other purposes. In the circuits 39 to 42 which follow the circuits 35 to 38 errors occurring in each case within a data block are corrected so far as they are correctable. Methods for error correction are known from the technical literature, particularly from the publications initially cited regarding digital recording on magnetic tape.

After being processed in the error correcting circuits 39 to 42, the data read out by the heads H0 to H3 are allocated to those sectors with which they were associated in recording. This is done by means of a crosspoint switching system with four inputs 44 to 47 and four outputs 48 to 51 for video data and one additional output 52 for audio data. Four memories 53 to 56 for video data and a memory 57 for audio data are respectively connected to the outputs 48 to 52. The connections through the crosspoint switching in the required manner for the inputs 44 to 47 with the outputs 48 to 51, are produced in response to signals provided at the control inputs 58, 59 and 60. Additional control inputs 64 to 65 are provided for connections to the output 52 (audio).

On the basis of geometric data (pattern, direction of rotation of the head wheel) only eight combinations are meaningful for relating the video data read out by the individual magnetic heads to the individual sectors to which they belong. These are illustrated in the table given in FIG. 4.

In addition FIG. 4 shows the corresponding control signals which are supplied to the inputs 58 to 60 of the cross point switch 43 of FIG. 3. If, for example, all control inputs are provided with the value zero, the video data from the head H0 is directed to the memory 53 for the sector S0, the video data from the head H1 likewise to the memory 56 for the sector S3, the video data from the head H2 likewise to the memory 55 to the sector S2 and the video data from the head H3 to the memory 54 for the sector S1.

The control signals represented in FIG. 4 for the crosspoint switch represent the then existing position of the magnetic heads relating to the track pattern in the following manner:

When the signal S58 has the value 0, then those heads which have written tracks with even numbers also read tracks with even numbers. However, when those heads which have written tracks with even numbers read tracks with odd numbers, signal S58 has the value 1. Additional control signals S59 and S60 designate the phase position of the head wheel in respective subdivisions of 90°.

In normal reproduction operation S58 is either 0 or 1, while the signals S59 and S60 run through their full possible set of combinations per head wheel revolution. If instead of normal reproduction operation, operation takes place at a speed different from the recording speed, then all these eight combination are necessary in different sequences.

A first illustrative embodiment for the generation of the control signals is now further explained with reference to FIGS. 3 to 5. Control signals are obtained from the identification signals.

The identification signals consist of two bytes and designate the identity of the data block that follows with reference to the subdivision of a complete data stream on the four channels and with reference to the position within the television. Only two bits of the 16-bit identification signal are necessary, however, for controlling the crosspoint switch 43—namely those bits which designate the sectors S0 to S3 to which the data block belongs. For simplifying this explanation, at least two bits are referred to below as an identification signal.

According to the position of the head wheel, at least two and more often three magnetic heads read out identification signals at the same time. Because of the prescribed track pattern, the identification signals contained redundance with reference to the information necessary for controlling the cross point switch. This redundance is utilized for increasing the safety margin against false switching of the cross point switch in the case of read out errors in the identification signal reception. For this purpose the identification signals are supplied to the address inputs of a programmable read-only memory (PROM) 61, from the data outputs of which the control signals S58, S59 and S60 are obtained.

Before explaining the derivation of the control signals from the identification signals by the means of the PROM 61, however, the following should be noted:

A magnetic head, which is located outside of the region in which the tape lies close to the head wheel, itself reads no signal. Since for the designation of the four sectors S0 to S3 only two bits are available, it is not possible to obtain from the identification signal that the head in question is outside of the tape contact region. In the illustrated embodiment, however, the circuits 35 to 38 are each provided with a memory, so that the latest identification signal from the tape is given but when the head is not in contact with the tape.

FIG. 5 shows an excerpt of the content of the PROM 61 in tabular form. The columns designated IH3 to IH0 and values for the identification signals of the heads H3 to H0 are shown, while the columns S58 to S60 show the corresponding control signals S58 to S60. In the column F, the value of a signal is given which is supplied to the input 62 of the crosspoint switch 43 (FIG. 3)

which has the consequence of providing an error flag upon the storage of the corresponding data block. In the columns H3 to H0, those sectors are designated to which the video data of the heads H3 to H0 are supplied.

The values to be called out for all of the respective combinations of identification signals of the heads H3 to H0 are stored in the PROM 61 (FIG. 3). The complete table stored in the PROM accordingly has 256 lines, of which only four are shown in FIG. 5. In the establishment of the table what is stored is determined on the basis that the identification signals read from various heads are correct if and when their values are in accordance with the track pattern. In column b) for example the sequence of identification signals 0, 1, 2, 3 is possible for the given track pattern and distribution of the sectors on the tape. It is therefore initially assumed that all identification signals are correctly read out. The crosspoint switch is controlled in such a way that the signals from the head H3 go to the sector S0, the signals from the head S2 to the sector S1, the signals from the head H1 to the sector S2 and the signals from the head H0 to the sector S3. For this purpose the crosspoint switch is controlled with the signals 110. Since in this case a trouble-free directing of the signals was possible, no error flag F is set.

In the identification signals shown in line a), one error is present (at least), because simultaneous scanning of two identical sectors is not possible. Since, however, the identification signals IH3, IH2 and IH1 represent a combination that is possible for the given track pattern, it is assumed that these identification signals are correct and that the identification signal IH0 was erroneously read. According to the track pattern IH0 would have had to be 3. In line a) of the table of FIG. 5, it is therefore provided that the crosspoint switch is correspondingly controlled. The numbers in parentheses indicate that here a value has been assumed.

In the case of the values in line c) the identification signals IH1 and IH0 are taken as correct and the values for IH3 and IH2 are replaced by them in accordance with the track pattern. In the combination of identification signals in line d), no correspondence to the track pattern can be determined. The consequence is therefore drawn that an unambiguous correlation of the heads to the sectors on the basis of identification signals is not possible. For this reason the position of the crosspoint switch has not changed from its previously determined setting, but in the memories an error flag F is set for the data block in question. Experiments have shown that such a case arises extremely rarely. However, by the setting of the error flag, an additional error correction system which an be provided in accordance with the above-mentioned publication Tech 3252-E can be useful for taking care of that case.

For control of the crosspoint switch with reference to the audio signals, an additional PROM 63 is provided from which a two-bit wide output signal is supplied to the control inputs 64 and 65 of the cross point switch 43 (FIG. 1). Since at any time only one magnetic head can read audio data, only one of the inputs 44 to 47 is switched through to the output 52. It can be seen from the two most significant bits (MSB) of the complete identification signal whether an audio or a video data block is present. Accordingly these two MSBs are supplied from the circuits 35 to 38 to the inputs of the PROM 63. The table required for storage in PROM 63 is put together in such a way that the crosspoint switch 43 is correspondingly set only if an identification signal from one of the heads designates an audio data block. If identification signals of several heads indicate that audio data blocks are being read, the previous setting of the cross point switch is preserved and the stored data block is provided with an error flag that is provided by the PROM 63 to a further input 66 of the crosspoint switch.

Figure 6:
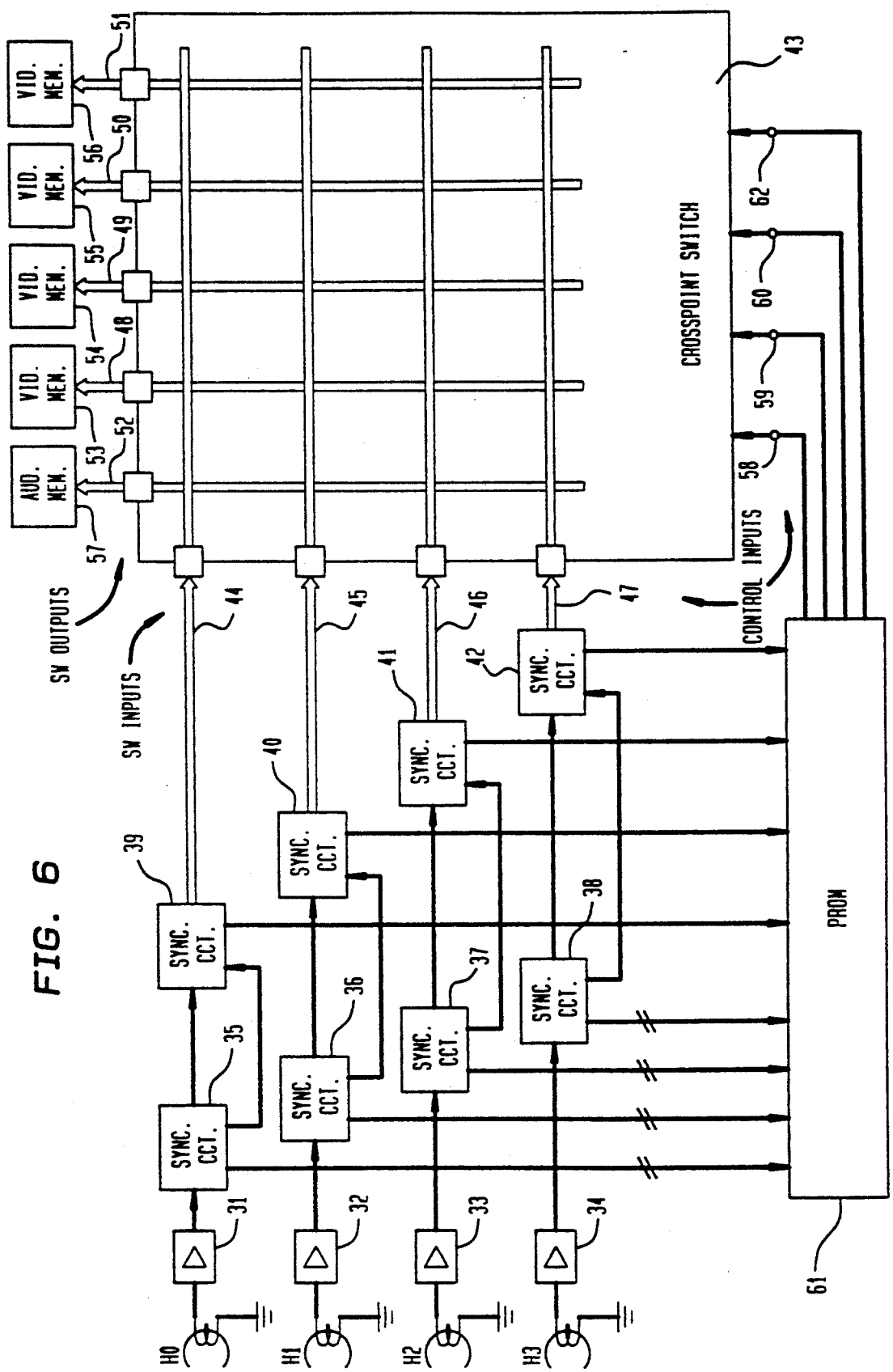
FIG. 6 is a block circuit diagram of a second illustrative embodiment of the invention in which the control signals are derived from the identification signals.

In the embodiment illustrated in FIG. 6, the control signals for the crosspoint switch are likewise obtained from the identification signals. For increasing the safety against false switching, however, supplementary signals are evaluated which show the data block is being read out without error. The error recognition and correction provisions of the circuits 39 to 42 do not actually cover the identification signals which precede the respective data blocks. It is permissible to conclude, however, that in the case of an error free data block the identification signals were also read without error.

The signals designating the freedom from error of a data block supplied to respective additional inputs, shown at the right in FIG. 6, the PROM 71, which like the PROM 61 of FIG. 3, is also addressed by the identification signals of the circuits 35 . . . 38. A table is stored in the PROM 71 which is expanded compared to the table of FIG. 5. In the determination of this table, it is assumed that those identification signals or blocks, for which signals taken from the error correction circuits 39 to 42 show freedom from error in the data block, are correct and that accordingly the other identification signals and to be corrected if they deviate from the sequence required by the track pattern. A similar arrangement can be provided for the audio signals which has been omitted in FIG. 6 in order not to complicate the drawing further.

As has already been indicated in connection with FIG. 3, the control signals can also be derived from the phase position of the head wheel and/or from the phase relation of the head wheel to the control track on the tape. The advantage of this possibility is that the derivation is independent of read-out errors. It is necessary, however, in that case for the crosspoint switch, or else a control unit provided for the crosspoint switch, to have corresponding signals made available to it from the head wheel. But that, for example, is not the case in so-called E-E operation when the head wheel is not driven. Furthermore, the necessary connections for the signals involve additional expense especially when the transport equipment and the head wheels are located in a component remote from a signal processor which also contains the crosspoint switch.

Figure 7:
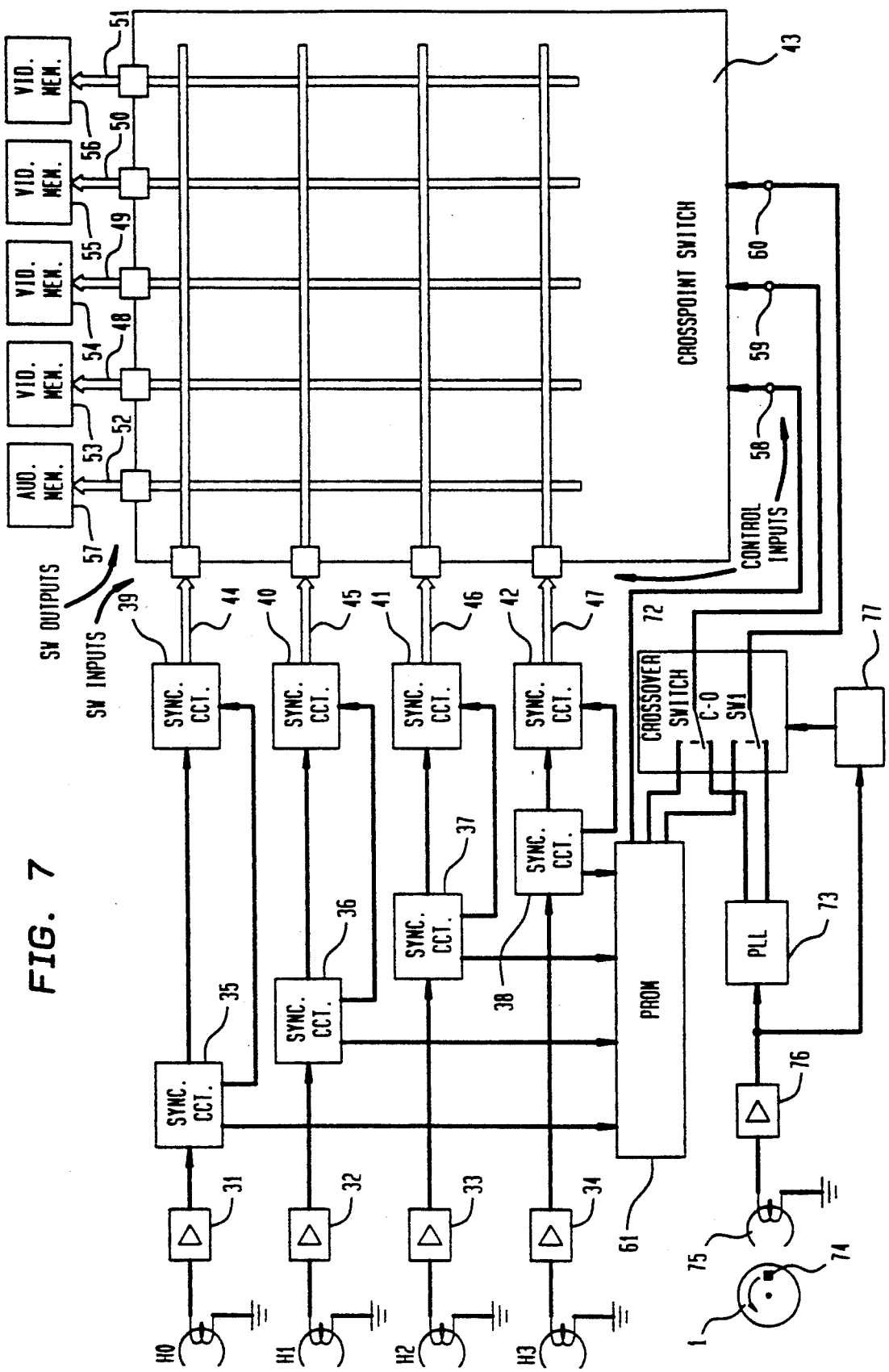
FIG. 7 is a block circuit diagram of a third illustrative embodiment of the invention, in which identification signals and head wheel pulses are used for derivation of the control signals.

The embodiment illustrate in FIG. 7 combines the advantages of generating the control signals for the crosspoint switch with the help of head wheel pulses with the advantages which are brought along by the generation of control signals from the identification signals. One of the control signals S58 is taken from the identification signals in the same way as is described in FIG. 3. The other two signals S58 and S60 are derived either from the head wheel pulses or from the PROM 61 according to operating condition of the magnetic tape machine. A change-over switch 72 is provided which in the position shown in the drawing connects the output of a phase-locked loop (PLL) circuit 73 with the inputs 59 and 60 of the cross point switch 43. A magnet 74 is provided at a suitable position on the head wheel 1 for obtaining the head wheel pulses when the magnet 74 passes by a fixed magnetic head 75. This is amplified in a circuit 76 and controls the phase-locked loop circuit 73. For the PLL circuit 73 a digital PLL circuit can conveniently be used in which a counter of substantially higher frequency than the frequency of the head wheel pulses is in operation and is reset by the head wheel pulses. Each successive quarter revolution of the head wheel output signals are set at 0 or 1 according to the content of the counter.

When for reasons mentioned above no head wheel pulses are available, the switch 72 is put into its upper position, so that the equipment of FIG. 7 operates in the same manner as the equipment of FIG. 3. The switching over of the switch 72 can be done manually. It is also possible to provide the circuit 77, in which it is determined whether head wheel pulses are present, for controlling the switch 72.

Figure 8:
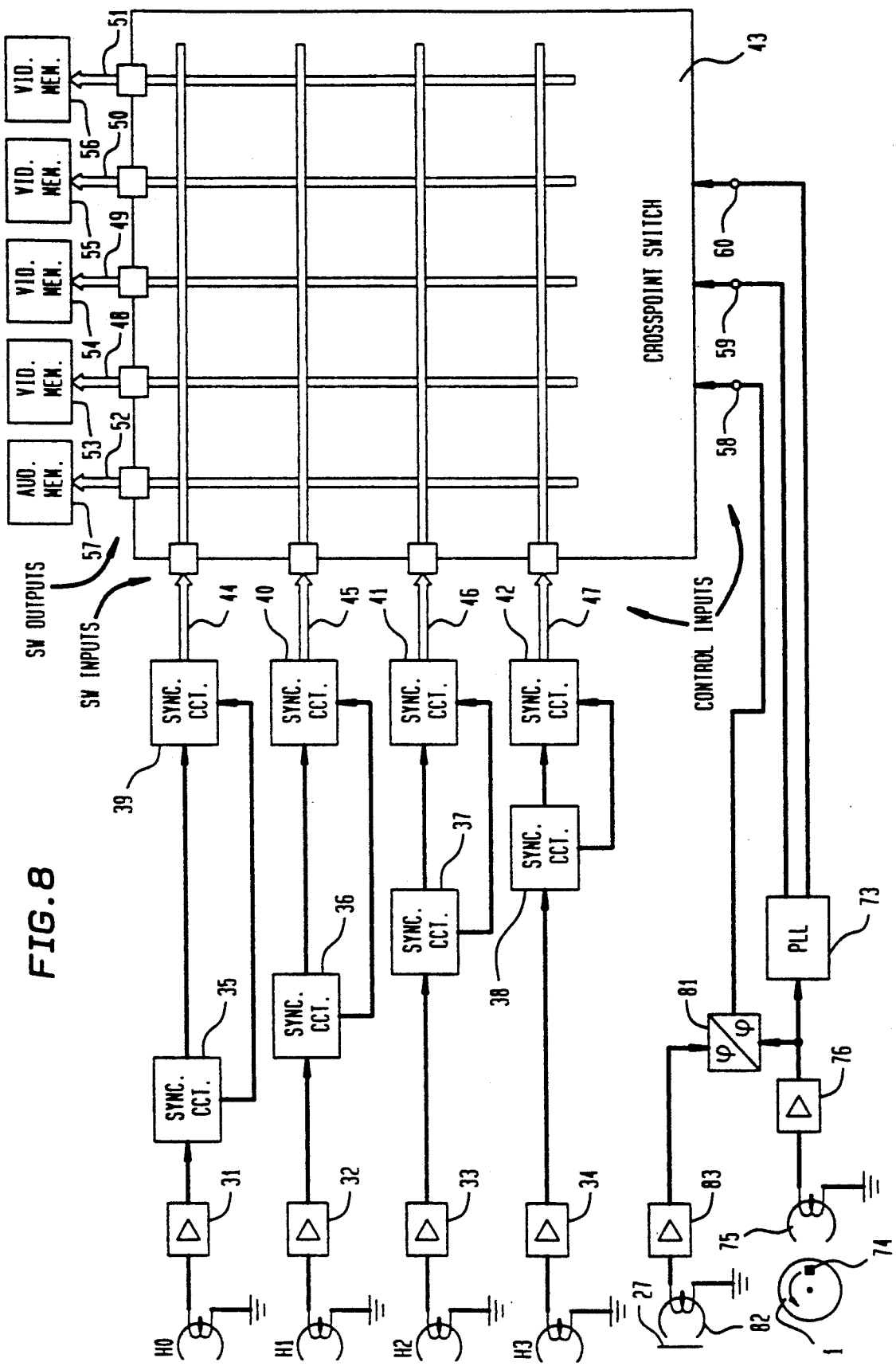
FIG. 8 is a block circuit diagram of a fourth illustrative embodiment of the invention, in which control signals are obtained from head wheel and control track information.

In the embodiment according to FIG. 8 the control signals S59 and S60 are derived in the same way as described in connection with FIG. 7. In FIG. 8, the signal S58 is derived from the phase relation between the head wheel pulses and the pulses recorded on the control track 27 of the tape (FIG. 2). Among other pulses the control track 27 obtains, in accordance with Tech 3252-E so-called servo-reference double pulses, referred to hereinafter as reference pulses, having a sequence frequency of 150 Hz at normal tape speed. The speed of the head wheel is 150 revolutions per second. On account of the normalization of the relative position of the reference pulses to the track pattern a prescribed phase relation is produced in normal speed operation between head wheel pulses and reference pulses. By normal reproduction is meant a reproduction at which the even-numbered heads scan the tracks recorded by even-numbered heads and the odd-numbered heads scan the tracks recorded by odd-numbered and in which no in-scan change of tracks takes place, which means that the head wheel is fixedly coupled with the tape movement.

In other operating conditions, the phase position between the reference pulses and the head wheel pulses deviate at least temporarily from each other. This can be determined in a phase comparison circuit 81, the output of which is connected to the input 58 of the cross point switch. The head wheel pulses, provided as an output by the amplifier 76 and also the reference pulses from the control track 87 are supplied to the phase comparison circuit 81. For the reference pulses a head 82 is schematically shown and likewise a reproduction amplifier 83.

Figure 9:
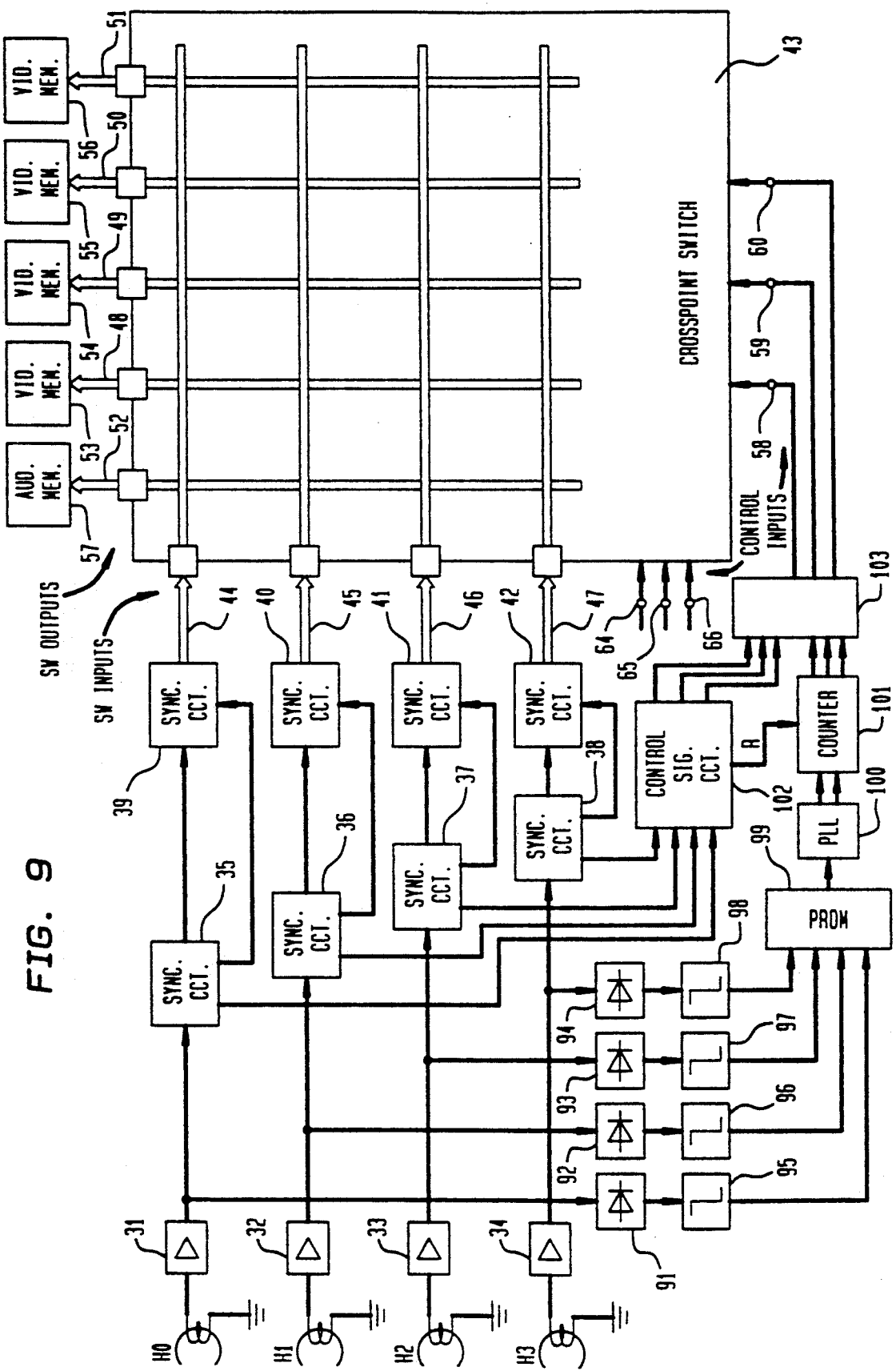
FIG. 9 is a block circuit diagram of a fifth illustrative embodiment of the invention, in which track change signals are used for derivation of the control signals.
Figure 10:
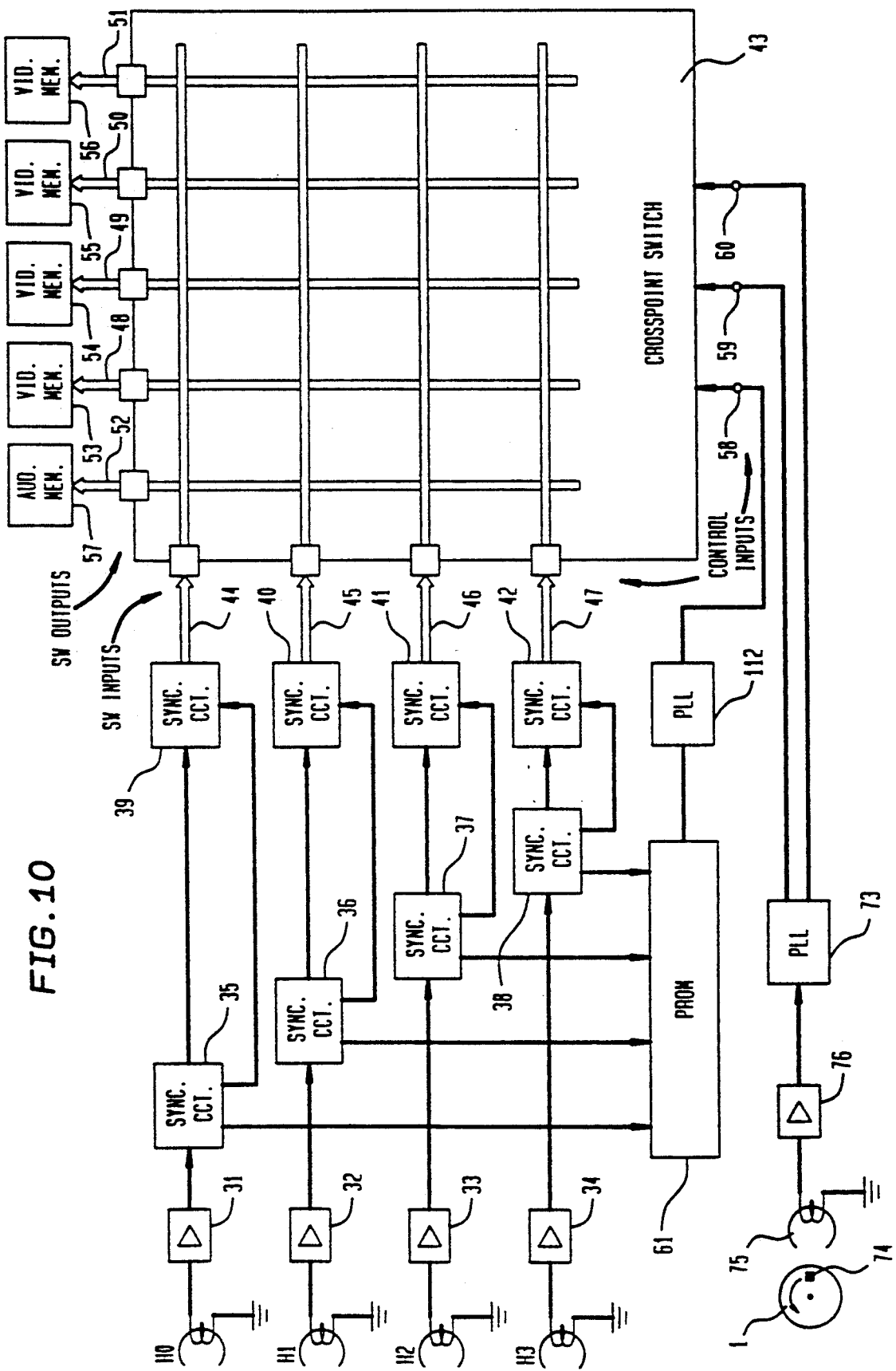
FIG. 10 is a block circuit diagram of a sixth illustrative embodiment of the invention.

In the arrangements respectively shown in FIGS. 9 and 10, the control of the crosspoint switch is made more reliable with respect to switch error at reproduction speeds which deviate from the recording speed. In both cases there are provided signals which show a change of the track being scanned. In the system of FIG. 9 the envelope curve of the output signals of the magnetic heads is used, whereas in the system of FIG. 10 the locations of the identification signals designating the track are evaluated.

For deriving the change of track signals in FIG. 9, the output signals of the signal preparation circuits 31 to 34 are respectively supplied to the amplitude demodulators 91 to 94. The threshold circuits 95 to 98 are respectively connected to the outputs of the amplitude demodulators 91 to 94. The threshold circuits provide an output signal of value 1 if the amplitude of the reproduced signals is less than the prescribed threshold value.

Change of track takes place at the same time for those magnetic heads which are in contact with the tape, whereas in the case of heads that have no contact with the tape, a signal is provided at the output of the corresponding threshold value circuit of a size corresponding to that of the change of track signal. Still, such a signal could still be produced in the case of a drop-out defect in the tape. In order to prevent that erroneous change of track signals should be produced, evaluation of the individual change of track signals by means of a PROM 99 as well as PLL circuit 100 is provided. The PROM 99 essentially has the effect that a change of track signal will be provided only when all the individual change of track signals are present. The PLL circuit 100 serves to avoid producing an error when an occasional output pulse of the PROM 99 fails to be produced. The use of a PLL circuit is made possible by the fact that the phases of readability of the data and the phases of crossing the gaps between the tracks have a constant ratio to each other and a frequency which is dependent upon the tape speed.

The output pulses of the PLL circuit 100 are counted in a counter 101, having a multiplace output signal which is incremented by 1 at every track change pulse. In the equipment according to FIG. 9, in addition to the described arrangement for deriving the track change pulses there is a circuit 102 for deriving control signals which operates for example according to the method explained in connection with FIGS. 3 and 6. This further shows that in normal operation with reliable control signals S58 to S60, the counter 101 is reset. Both the output signals of the control 101 and the output signals of the circuit 102 are supplied to a logic circuit 103, in which the input signals are compared with each other, as a result of which a further reduction of the error possibilities is provided for the signals S58 to S60.

In the circuit of FIG. 10, a control signal is obtained by means of the PROM 111 from the identification signals and this indicates whether the tracks are being read by the heads which have recorded them. In order to prevent erroneous switching by transient errors in the identification signals, a circuit 112 having a low-pass filter characteristic is interposed in the output of the PROM 111.

In reproduction at tape speeds that differ from the recording speed, track changes take place at regular time intervals. For this reason the circuit 172 for these speeds can include a PLL circuit—similar to the circuit 100 in FIG. 9.

Figure 11:
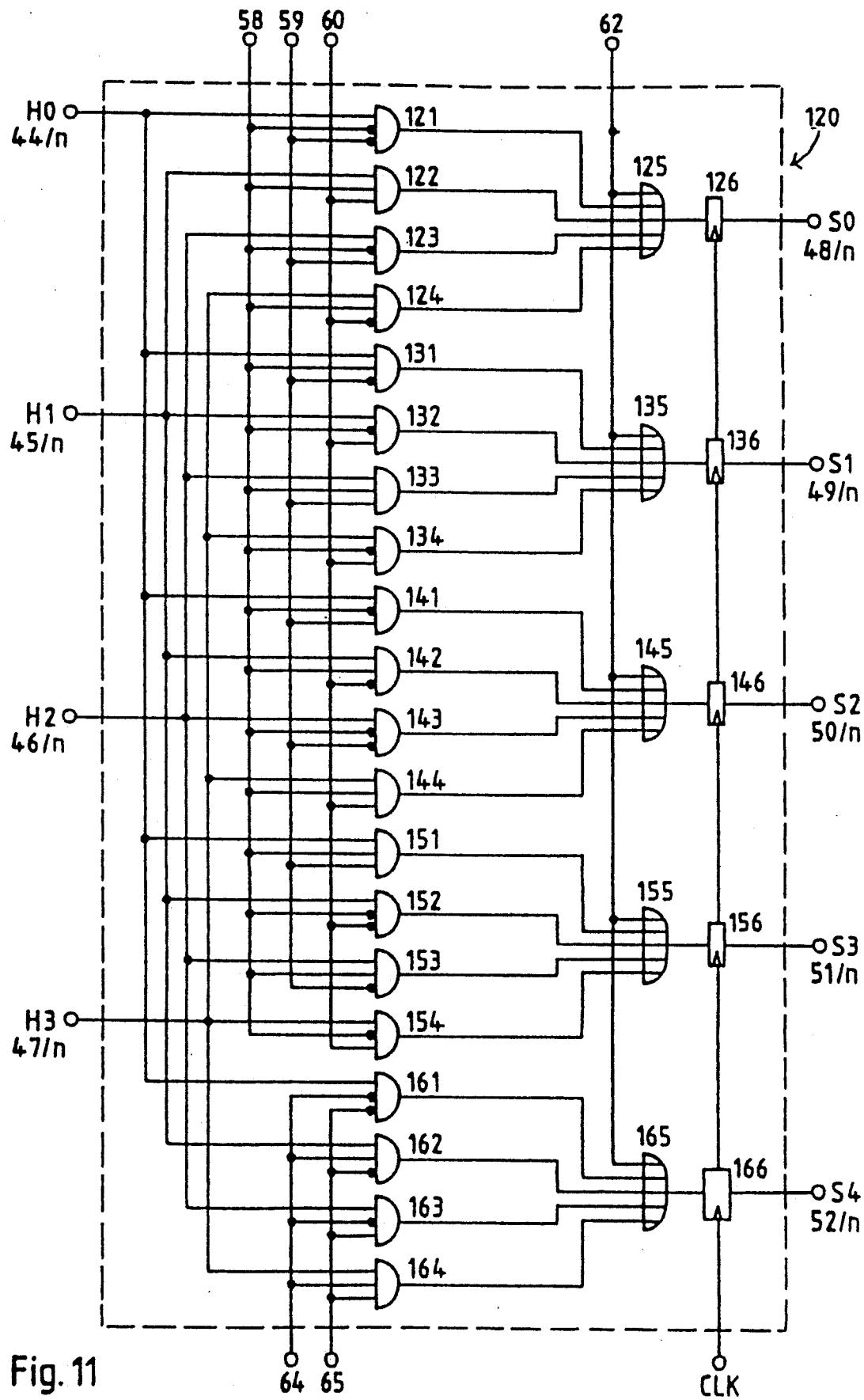
FIG. 11 is an excerpt-type block circuit diagram of an electronic cross point switch for distribution of the video data among several memories.

FIG. 11 shows a portion of an electronic embodiment of the cross point switch 43, in which substantial saving in circuit costs is obtainable compared to the multiplexers commonly used for cross point switches, by the use of programmable array logic (PAL). Since the data streams from the circuits 39 to 42 which are to be switched are in each case 9 bits wide, nine of the circuits illustrated in FIG. 11 are connected in parallel.

The PAL circuit 120 is composed of OR-gates 125, 135, 145, 155, 165 and AND-gates 121 to 124, 131 to 134, 141 to 144, 151 to 154 and 161 to 164. Each OR-gate is followed by a register 126, 136, 146, 156, 166. Control inputs 58, 59 and 60 can be connected by the programming with inputs of the AND-gates either invertingly or non-invertingly. There is available under the designation 16RG a suitable integrating nine-bit integrated for the circuit according to FIG. 11. This is equipped with six inputs, so that per binary place of the 9-bit data bytes one integrated circuit suffices for the four video outputs and the audio output. One output remains unused in this case. In order to make plain the relation between the inputs or the outputs in this figure to the inputs and outputs of the cross point switch shown in FIG. 3 and at the same time to make clear that inputs and outputs in FIG. 11 involves only one bit each, there are used for designation of the inputs and outputs of FIG. 11 the same reference numerals as in FIG. 3 at the end of which "/n" has been added. n signifies a number from 1 to 9 according to which bit the illustrated circuit is used to process.

The programming of the logic circuit 120 corresponds to the table illustrated in FIG. 4. Thus for example for a value of 001 for the control signal the AND-circuit 121 where the signal supplied at 44/n is conducting, while the other AND-circuits 122, 123 and 124 are non-conducting. The signal of the head H0 is thereby supplied through the AND-circuit 121 and the OR-circuit 125 to the output 48/n. Correspondingly with the same control signal the signal from magnetic head H1 is directed over the input 45/n, the AND-circuit 132 and the OR-circuit 135 to the output 49/n. The input 46/n is connected to the output 50/n and the input 47/n with the output 51/n. By the control with the 3-bit wide control signal as well as the corresponding programming, it is possible by means of the cross point switch to switch mainly those connections which are actually meaningful on the basis of the track pattern.

The audio signals collected in the manner already described from the individual magnetic heads can be switched under control of the control inputs 64 and 65 to the audio output 52/n. One additional control input serves for insertion of the error flags.

Although the invention has been described with reference to a particular illustrative example, it will be recognized that variations and modifications are possible within the invention concept.

We claim:

1. In a machine for reproducing video data recorded on magnetic tape in oblique tracks on the tape, each of which includes a group of video data blocks belonging to one recording sector separated from another group of video data block belonging to another recording sector with audio information blocks in between, each said group of video data blocks being composed of sequences of two data blocks, each said sequence being preceded by identification information including a sector designation, with sector designations as recorded succeeding each other in identical complete sequences of all sectors a plurality of times within each picture field in a predetermined repeating sequential sector pattern, said tracks being recorded and scanned by a repeating succession of several magnetic heads mounted on a revolving head wheel in a manner bringing at least two said heads in contact with the tape at all times during recording and during playback, apparatus for improving reproduction of said video data when said machine operates at a tape transport speed different from the tape transport speed at which said video data was recorded, comprising:

means, connected to the output of each of said magnetic heads during data reproduction, for separating sector designations:

read-only memory means, connected to said signal separating means, for generating cross-point switch control signals in response to said separated sector designations;

separate sector memories for video data, each for storing data blocks having the same sector designation, and cross-point switch means, controlled by said cross-point switch control signals, for changing connections, at the same time, of outputs derived from respective outputs of as many as necessary of said respective heads as necessary for consistency with said repeating sequential sector pattern with an equal number of said respective sector memories in accordance with those sector designations separated by said separating means which are consistent with said repeating sequential sector pattern, all said sector memories thereby being connected to respective outputs of said cross-point switch means in a manner consistent with said repeating sequential sector pattern.

2. Apparatus according to claim 1, wherein said means for generating cross-point control signals is a programmable read-only memory (PROM).

3. Apparatus according to claim 1, further comprising:

means for producing pulses at the rate of revolution of said head wheel and a phase locked loop (PLL) circuit for together providing information of angular position of said head wheel in the form of two bits of each said cross-point switch control signal corresponding to a quadrant of the revolution of said head wheel; and means for deriving a third bit of each said cross-point switch control signal from said sector designations for signifying thereby whether the respective correlations of the angular positions of said head wheel with said tracks in recording and in reproduction are identical or offset by one track.

4. Apparatus according to claim 1, further comprising:

means for producing pulses at an integral multiple of the rate of revolution of said head wheel and a phase locked loop (PLL) circuit for together providing information of angular position of said head wheel in the form of two bits of each said cross-point switch control signal designating a quadrant of the revolution of said head wheel in which the angular position of said head wheel is located; and means for deriving a third bit of each said cross-point switch control signal by reproducing reference pulses from a longitudinal control track on said tape and evaluating the phase difference between said reference pulses and said pulses produced at a multiple of the rate of revolution of said head wheel.

5. Apparatus according to claim 1, wherein said cross-point switch means has controllable cross-points constituted as multiple bus drivers.

6. Apparatus according to claim 1, wherein said cross-point switch means is built of programmable array logic (PAL) components.

7. Apparatus according to claim 1 comprising also an audio data memory and wherein said cross-point switch means has a connection through an additional output of said cross-point switch means to said audio data memory and wherein means are provided for switching audio data block signals produced by said respective magnetic heads to said additional output of said cross-point switch means by means of an additional two bits of each of said cross-point switch control signals signifying that said additional output is currently an output of audio data valid for storage.

8. A method of allocating digitally coded data read-outs from several magnetic heads to respective transmission channels, said heads being mounted on a revolving scanning device for obliquely scanning a moving magnetic tape, in a manner causing each of said magnetic heads to go out of contact with said tape at regular intervals in a repeating sequence while there always remains a plurality of said magnetic heads in contact with said tape, said data being obtained by read-out performed by said magnetic heads at a read-out speed that does not have to be the speed at which said recorded data was recorded, said data having been recorded on oblique tracks on said tape in sequences of data blocks, each said sequence having a preceding distinguishing sector designation recorded on said tape in such a way as to identify the sector designation of each said data block sequence, said sector designations corresponding to a predetermined allocation of data to several recording heads by which said data was recorded on said tape in a predetermined repeating sector sequence pattern, said data allocating method comprising the steps of:

identifying, from said recorded designations, the sectors to which corresponding data blocks belong, as said designation are read-out by said several magnetic heads;

deriving switch-control signals from those of said recorded sector designations, as read-out by said several read-out heads, which are found by reference to predetermined stored information to be consistent with said repeating sector sequence pattern in which said data was recorded on said tape;

applying said switch control signals derived from said read out sector designations to a cross-point switching system and thereby changing connections of a number of said several magnetic heads to an equal number of respective inputs of said transmission channels individually serving different sectors of said read out data, said number of changes of connections being as great as necessary for consistency with said repeating sector sequence pattern, and if said number is greater than one, said changes of connections are made at the same time.

9. Method according to claim 8 wherein, when the step of identifying the sector to which data blocks of said sequence belong results in provision of substantially simultaneous sector designations from a plurality of substantially simultaneous read-outs of said respective magnetic heads which are consistent with said repeating sector sequence pattern, said read-outs shall be individually recognized as consistent with said repeating sector sequence pattern and said step of deriving switch control signals is carried out on the basis of the aforesaid recognition.

10. Method according to claim 8, wherein the step of identifying the sectors to which data blocks belong is done with storage of sector designations read out from each of said magnetic heads until together sector designation is read out from the same magnetic head and wherein the step of deriving switch control signals from said sector designations is performed to take account of the fact that one of said four magnetic heads is always out of contact with said tape when said sector designations are read out by the others of said four magnetic heads, by causing each said switch control signal to maintain for that one of said magnetic heads which is out of contact with the tape a connection previously established with a said transmission channel by a last previous operation of said cross-point switching system.

11. Method according to claim 8, wherein each said sequence of data blocks, as recorded on said tape is preceded by identification signals including a sector designation, and wherein the step of identifying the sector designations of the data blocks currently being read out is performed by separating identification signals relating to said sector designations from the respective read-outs of said magnetic heads and then evaluating the validity of the respective sector designation read-outs by reference to said repeating sector sequence pattern, and wherein there are utilized, for producing said switch control signals, only those sector designations which are consistent with said repeating sector sequence pattern.

12. Method according to claim 11, wherein the data blocks read out by the respective magnetic heads are individually processed for error recognition with consequent designation of those blocks thereby determined to be error free, and wherein the sector designations pertaining to said data blocks which are found to be error free are given priority over other sector designations and wherein only said switch control signals derived from sector designations thus given priority are applied to said cross-point switching system.

13. Method according to claim 11, wherein pulses are produced which are timed by the revolution of said scanning device on which said several magnetic heads are mounted, thereby making information available regarding angular position of said scanning device and of said several heads at the time of each of said pulses and are used to contribute to the derivation of said switch control signals at least in the absence of any said sector designation which is contemporarily found consistent with said repeating sector sequence pattern.

14. Method according to claim 13, wherein said pulses timed by the revolution of said scanning device are provided in 3-bit signals, of which one bit contains information regarding whether the correlation of the angular position of the scanning device to the tracks on the tape respectively in recording and in reproduction is the same or is offset by one track, and wherein the remaining bits indicate the angular position of the scanning device.

15. Method according to claim 14, wherein said control signals include at least one said bit derived from sector designations and two bits obtained by evaluation of the pulses produced by revolution of said scanning device.

16. Method according to claim 15, wherein during the absence of said pulses timed by revolution of said scanning device, said switch control signals are derived entirely from said sector designations.

17. Method according to claim 13, wherein said switch control signals are derived with further contributions from the phase relation between the angular position of the scanning device and pulses which are read out from a longitudinally disposed control track near one edge of the tape, said contributions being made at least in the absence of any sector designation which is contemporarily found consistent with said repeating sector sequence pattern.

18. Method according to claim 8, wherein a preliminary step of tape speed selection is performed in which a tape speed different from the recording tape speed is selected and then during reproduction of data at said selected speed track change signals are derived from the output of said magnetic heads and in response to said track change signals, said switch control signals are derived by means of a stored table representing the position of the designated sectors on the tape.

19. Method according to claim 18, wherein said track change signals are produced by detecting envelope curve modulation of the respective output signals of said magnetic heads.

20. Method according to claim 18, wherein said track change signals are obtained by comparing a said sector designation identifying a first block sequence with a sector designation identifying a second and immediately preceding block sequence read out by the same head and a track change signal is generated when those first and second sector designations are different.

21. Method according to claim 8, wherein the controlling of said cross-point switching system is performed so as to change any connection made by said cross-point switching system only in an interval during which no data are being read from the magnetic tape.

22. Method according to claim 8, wherein change of any connection made by said cross-point switching system is made to take place during a cross-over of at least one of the read-out heads from one track to another track.

* * * * *